(12) United States Patent
Donkervoort et al.

(10) Patent No.: US 11,504,922 B2
(45) Date of Patent: Nov. 22, 2022

(54) MULTI-LAYERED COMPOSITE STRUCTURES AND METHODS FOR THE PREPARATION THEREOF

(71) Applicant: Donkervoort Automobielen B.V., Lelystad (NL)

(72) Inventors: Jacob Adrianus Donkervoort, Loosdrecht (NL); Jordi Wiersma, Bilbao Bizkaia (ES)

(73) Assignee: Donkervoort Automobielen B.V., Lelystad (NL)

( * ) Notice: Subject to any disclaimer, the term of this patent is extended or adjusted under 35 U.S.C. 154(b) by 63 days.

(21) Appl. No.: 16/087,046

(22) PCT Filed: Mar. 23, 2016

(86) PCT No.: PCT/EP2016/056332
§ 371 (c)(1),
(2) Date: Sep. 20, 2018

(87) PCT Pub. No.: WO2017/162277
PCT Pub. Date: Sep. 28, 2017

(65) Prior Publication Data
US 2019/0099963 A1 Apr. 4, 2019

(51) Int. Cl.
| | |
|---|---|
| *B29C 70/08* | (2006.01) |
| *B32B 27/38* | (2006.01) |
| *B29C 70/02* | (2006.01) |
| *B32B 27/06* | (2006.01) |
| *B32B 5/20* | (2006.01) |
| *B32B 5/24* | (2006.01) |
| *B32B 27/08* | (2006.01) |
| *B32B 5/18* | (2006.01) |
| *B32B 5/26* | (2006.01) |
| *B29C 44/04* | (2006.01) |
| *B29C 44/12* | (2006.01) |
| *B29C 44/34* | (2006.01) |
| *B29C 44/60* | (2006.01) |
| *B29C 70/44* | (2006.01) |

(Continued)

(52) U.S. Cl.
CPC ............ *B29C 70/086* (2013.01); *B29C 44/04* (2013.01); *B29C 44/12* (2013.01); *B29C 44/3415* (2013.01); *B29C 44/60* (2013.01); *B29C 70/02* (2013.01); *B29C 70/025* (2013.01); *B29C 70/026* (2013.01); *B29C 70/44* (2013.01); *B32B 5/18* (2013.01); *B32B 5/20* (2013.01); *B32B 5/245* (2013.01); *B32B 5/26* (2013.01); *B32B 27/065* (2013.01); *B32B 27/08* (2013.01); *B32B 27/38* (2013.01); *B29K 2105/0076* (2013.01); *B29L 2009/00* (2013.01); *B32B 2250/02* (2013.01); *B32B 2250/03* (2013.01); *B32B 2250/04* (2013.01); *B32B 2250/05* (2013.01); *B32B 2255/02* (2013.01); *B32B 2255/26* (2013.01); *B32B 2260/021* (2013.01); *B32B 2260/04* (2013.01); *B32B 2262/0269* (2013.01); *B32B 2262/101* (2013.01); *B32B 2262/106* (2013.01); *B32B 2266/0271* (2013.01); *B32B 2307/3065* (2013.01); *B32B 2307/4026* (2013.01); *B32B 2307/50* (2013.01); *B32B 2307/72* (2013.01); *B32B 2363/00* (2013.01); *B32B 2419/00* (2013.01); *B32B 2457/10* (2013.01); *B32B 2535/00* (2013.01); *B32B 2571/02* (2013.01); *B32B 2605/00* (2013.01); *B32B 2605/08* (2013.01); *B32B 2605/12* (2013.01); *B82Y 30/00* (2013.01)

(58) Field of Classification Search
None
See application file for complete search history.

(56) References Cited

FOREIGN PATENT DOCUMENTS

| EP | 1964903 | A1 | 9/2008 |
| EP | 2 671 716 | A1 * | 12/2013 |
| EP | 2671716 | A1 | 12/2013 |

OTHER PUBLICATIONS

Taylor, Donkervoort D8 GT0 2014 Review—motoring.com.au, Jan. 25, 2014, XP055303916, Retrieved from the Internet: URL:http://www.motoring.com.au/donkervoort-d8-gto-2014-review-41191/ [retrieved on Sep. 20, 2016].

(Continued)

*Primary Examiner* — Mohammad M Ameen
(74) *Attorney, Agent, or Firm* — Michael J. Blessent; Bret E. Field; Bozicevic, Field & Francis LLP

(57) ABSTRACT

The present invention relates to multi-layered composite structures and to methods for the preparation thereof. The present multi-layered composite structures are light weight and capable of high load bearing making the present multi-layered composite structures especially suitable to be used as load bearing structures in, for example, automotive. Specifically, the present invention relates to methods comprising the steps of a) providing a mould for said multi-layered composite structure; b) layering said mould with two or more layers forming the outer surface of said multi-layered composite; c) filling said layered mould with a mixture comprised of non-expanded heat-expandable microspheres and closing said mould; and d) subjecting said closed mould to a temperature of 80° C. to 140° C. during 1 to 230 minutes thereby providing a relative pressure in said closed mould of 0.1 to 20 bar through expansion of said heat-expandable microspheres thereby forming a multi-layered composite structure in said mould with a foam enforced inner core and a multi-layered outer surface; and e) separating the multi-layered composite structure from said mould.

15 Claims, No Drawings

(51) Int. Cl.
*B29L 9/00* (2006.01)
*B29K 105/00* (2006.01)
*B82Y 30/00* (2011.01)

(56) References Cited

OTHER PUBLICATIONS

European Commission: Horizon 2020 SME Instrument Phase 1 beneficiaries Country City Beneficiary Website Proposal Acronym Long name Call Deadline Date Topic, Feb. 2016 cut off, Feb. 24, 2016, XP055303937, Retrieved from the Internet: URL:https://ec.europa.eu/research/participants/portal/doc/call/h2020/smeinst-13-2016-2017/1712613-sme-instrument-phase1-beneficiaries_febcut_off_2016_en.pdf [retrieved on Sep. 20, 2016].

* cited by examiner

MULTI-LAYERED COMPOSITE STRUCTURES AND METHODS FOR THE PREPARATION THEREOF

The present invention relates to multi-layered composite structures and to methods for the preparation thereof. The present multi-layered composite structures are light weight and capable of high load bearing making the present multi-layered composite structures especially suitable to be used as load bearing structures in, for example, automotive. Through use of the present methods, complex light weight load bearing multi-layered composite structures can efficiently and cost-effectively be manufactured.

The global application of load bearing multi-layered composite structures, and especially Fibre Reinforced Plastics such as Carbon Fibre Reinforced Plastics (CFRP), is growing at a fast pace due to its excellent strength to weight ratio. However, the application of load bearing multi-layered composite structures and especially Carbon Fibre Reinforced Plastics is still a costly business and therefore mainly restricted to the higher segment.

This is certainly the case for larger CFRP structures. The fabrication of components such as a car structure (chassis) requires the application of multiple layers of fibre material in combination with a core material, often foam, balsawood or honeycomb. A pressure vessel (autoclave) is required in order to consolidate these layers into one single structure. The investment in the correct tooling and a programmable autoclave has a tremendous effect on the production costs and flexibility in production and design. This makes it almost impossible for many manufacturers to take the leap to structural CFRP's.

The use of conventional composite production technologies poses another drawback. The moulds used for the production of composite components are in most cases single sided. This means, that complex structural components need to be assembled from several single sided elements. The components need to be prepared and glued in order to combine them into a functional structure.

Up until recently the production of light weight structural CFRP components was mainly possible through the use of a controlled, heated compression chamber also known as an autoclave. This has not changed since the first application of high-end composites many decades ago. The acquisition and installation costs of an autoclave, the running costs, the energy consumption, the cycle times and the consumption of additional materials are extremely high. Although "out-of-autoclave" CFRP materials are commercially available, these materials are limited to non-structural applications.

Out-of-autoclave CFRP's use vacuum pressure to consolidate the different fibre layers. The pressure for vacuum is limited to around 0.98 bar. For the consolidation of structural components higher pressures are required.

An alternative to autoclave production is Resin Transfer Moulding (RTM). This technology uses a series of complex moulds and injects resin into the dry fibres placed inside the moulds. RTM can be viable for very large volumes, but the initial investment for RTM is in most cases higher than autoclave production. Secondly, excess resin is injected into the dry fibres making the product heavy, inefficient and increasing the impact on the environment.

It is an object of the present invention, amongst other objects, to obviate at least partially, if not all, the above problems associated with load bearing multi-layered composite structures, and especially Fibre Reinforced Plastics such as Carbon Fibre Reinforced Plastics (CFRP).

This object of the present invention, amongst other objects, is met by the methods, multi-layered composite structures and uses thereof as described in the appended claims.

Specifically, according to a first aspect, the present invention relates to a method for producing a multi-layered composite structure, the method comprises the steps of:
   a) providing a mould, preferably a closed mould, for the multi-layered composite structure;
   b) layering the mould with two or more layers generally resulting in a total thickness of 0.5 cm to 10 centimetres, such as 1, 2, 3, 4, 5, 6, 7, 8, or 9 centimetres, or larger forming the outer surface of the multi-layered composite;
   c) filling said layered mould with a mixture comprised of non-expanded heat-expandable microspheres and optionally a curable resin, preferably an epoxy resin, and closing the mould; and
   d) subjecting the closed mould to a temperature of 80° C. to 140° C. during 1 to 230 minutes thereby providing a relative pressure in the closed mould of 0.1 to 20 bar, such as 0.5, 1, 3, 4, 5, 6, 7, 8, 9, 10, 11, 12, 13, 14, 15, 16, 17, 18 or 19 bar, through expansion of the heat-expandable microspheres thereby forming a multi-layered composite structure in the mould with a foam enforced inner core and a multi-layered outer surface; and
   e) separating the multi-layered composite structure from the mould.

Within the context of the present invention, relative pressure is defined as the difference in pressure inside the mould as compared to the pressure directly outside the mould, i.e. the pressure inside mould is always at least 0.1 bar higher than the pressure directly outside the mould.

The present inventors have surprisingly found that through the above method load bearing multi-layered composite structures can efficiently and cost effectively be manufactured. With respect to the pressures attainable in step (d), besides by temperature control, the desired pressures can be obtained by varying the amount of non-expanded heat-expandable microspheres in the mixture such as by further adding pre-expanded heat-expandable microspheres to the mixture.

The moulds used in the above method can be any sealable or closable mould capable of withstanding the pressures and temperatures generated during step (d). Inherently, the mould provides the negative or reverse image of a multi-layered composite structure to be manufactured.

The present mixture comprised of non-expanded heat-expandable microspheres and a curable resin optionally supplemented with pre-expanded heat-expandable microspheres forming the inner core provides through an expansion sufficient pressure inside the mould to obtain the present light weight multi-layered composite structures capable of high load bearing.

Depending on the number and nature of the layers used, the temperature and time used in step (d) can varied. Such variations are well within the knowledge of a person skilled in the art. Suitable relative pressures are in the range of 0.1 to 20 bar, preferably 2 to 10 bar, more preferably 3 to 9 bar and most preferably approximately 6 bar such as 0.5, 1, 2, 3, 4, 5, 6, 7, 8, 9, 10, 11, 12, 13, 14, 15, 16, 17, 18 or 19 bar. Such pressures can be readily obtained at temperatures in the range of 80° C. to 140° C., preferably 90° C. to 120° C. Suitable times to be used in the present method are in the range of 1 minute to 230 minutes such as 10 minutes to 230 minutes, preferably 15 minutes to 120 minutes, more preferably 20 minutes to 60 minutes depending on the heat distribution with the mould and the time needed to cure the heat curable resin.

An essential element in the present method is the use of heat-expandable microspheres. Heat-expandable microspheres are microscopic spheres comprising a thermoplastic shell encapsulating a low boiling point hydrocarbon such as isobutane. When heated to a temperature sufficient enough to soften the thermoplastic shell, the increasing pressure of the hydrocarbon will cause the microspheres to expand. The volume of the microsphere can increase by 35 to 80 such as 35 to 40 times. The expandable microspheres are generally off-white, can be 6 to 40 micrometres in average diameter and can have a density of 900 to 1400 kg/m$^3$(6.5 to 30 kg/m$^3$). The expandable microspheres are known to be used as a blowing agent in products such as automotive underbody coatings or injection moulding of thermoplastics. The expanded microspheres are white, can be 15 to 120 micrometres in average diameter and can have a density of 25 to 70 kg/m$^3$(25 tot 70 kg/m$^3$). Suitable microspheres are, for example, described in U.S. Pat. No. 3,615,972

Within the context of the present invention, mixture comprised of non-expanded heat-expandable microspheres and a curable resin such as an epoxy resin can be further supplemented with additives for colouring and the alteration of material specifications, such as compression strength, flexibility, thermal properties, etc.

In general, uncured resins, such as epoxy resins, have only poor mechanical, chemical and heat resistance properties. However, good properties are obtained by allowing the resin to react with suitable curatives to form three-dimensional cross-linked thermoset structures. This process is commonly referred to as curing.

Curing may be achieved by reacting a resin with itself (homopolymerisation) or by forming a copolymer with polyfunctional curatives or hardeners. Common classes of hardeners for resins include amines, acids, acid anhydrides, phenols, alcohols and thiols.

The present resins will cure at elevated temperatures such as temperature up to 140° C. The cure temperature should typically attain the glass transition temperature (Tg) of the fully cured network in order to achieve maximum properties. In the present method, hardeners may be used which show only low or limited reactivity at ambient temperature, but which react with the resins at elevated temperature.

The resin curing reaction may be accelerated by addition of small quantities of accelerators. Tertiary amines, carboxylic acids and alcohols (especially phenols) are effective accelerators.

According to a preferred embodiment of the present method, the inner core forming mixture can be further modified by adding strength enforcing fibres such as carbon nanotubes or carbon fibre thereby further influencing the mechanical properties of the foam inner core.

According to another preferred embodiment, the present mould can be provided with a heat generating layer on the inner-surface thereof. Such layer is in proximate contact with the present pre-multi-layered composite structure and allows for controlled and precise heating and thereby curing. This embodiment is especially suitable for large and/or complex structures especially with respect to the latter, the heat generating layer allows for local differences in heating thereby allowing for a uniform and controlled curing of the final product. A heat generating layer can be provided by a metal film or mesh allowing electric heating and/or providing improved heat transfer to the structure to be cured.

Also with respect to controlled and uniform curing of the final product, the present method uses, according to yet another preferred embodiment, moulds provided with a temperature sensing means capable of measuring the temperature inside the mould. Obviously, direct, preferably real-time, measurement of temperature further improves uniform and controlled curing of the final product.

According to an especially preferred embodiment, the mould used in the present method is comprised of an epoxy based material. Using such mould provides cost effective means to design moulds and, additionally, allows for the manufacture of complexed shapes.

According to another especially preferred embodiment, the present two or more layers are selected from the group consisting of carbon fibre layer, aramid fibre layer and glass fibre layer.

A carbon fibre layer is comprised bundles of continuous individual carbon filaments held together generally protected by an organic coating of polyethylene oxide (PEO) or polyvinyl alcohol (PVA). Each carbon filament is a continuous cylinder generally with a diameter of 5 to 10 micrometres. The atomic structure of a carbon fibre is similar to that of graphite, consisting of sheets of carbon atoms arranged in a regular hexagonal pattern. Carbon fibre is used to reinforce composite materials. Non-polymer materials can also be used as the matrix for carbon fibres. Reinforced carbon-carbon (RCC) consists of carbon fibre-reinforced graphite, and is used structurally in high-temperature applications. The fibre also finds use in filtration of high-temperature gases, as an electrode with high surface area and impeccable corrosion resistance, and as an anti-static component. Moulding a thin layer of carbon fibres significantly improves fire resistance of polymers or thermoset composites because a dense, compact layer of carbon fibres efficiently reflects heat.

Aramid fibres are a class of heat-resistant and strong synthetic fibres. They are used in aerospace and military applications, for ballistic-rated body armour fabric and ballistic composites, in bicycle tires, and as an asbestos substitute. Aramids are generally prepared by the reaction between an amine group and a carboxylic acid halide group. The most well-known aramids are Kevlar, Twaron, Nomex, New Star and Teijinconex. Nomex, Teijinconex and New Star contain predominantly the meta-linkage and are poly-metaphenylene isophthalamides (MPIA). Kevlar and Twaron are both p-phenylene terephthalamides (PPTA).

Glass fibres are formed when thin strands of silica-based or other formulation glass are extruded into many fibres with small diameters. The most common types of glass fibre used in fiberglass is E-glass, which is alumino-borosilicate glass with less than 1% w/w alkali oxides, mainly used for glass-reinforced plastics. Other types of glass used are A-glass (Alkali-lime glass with little or no boron oxide), E-CR-glass (Electrical/Chemical Resistance; alumino-lime silicate with less than 1% w/w alkali oxides, with high acid resistance), C-glass (alkali-lime glass with high boron oxide content, used for glass staple fibres and insulation), D-glass (borosilicate glass, named for its low Dielectric constant), R-glass (alumino silicate glass without MgO and CaO with high mechanical requirements as reinforcement), and S-glass (alumino silicate glass without CaO but with high MgO content with high tensile strength).

According to yet another especially preferred embodiment of the present invention the present two or more layers comprise at least one carbon fibre layer or glass fibre layer thereby allowing for the manufacture of Fibre Reinforced plastics and especially Carbon Fibre Reinforced Plastics (CFRP).

According to still another preferred embodiment, the present method provides multi-layered composite structures with a surface structure comprised of, besides the present foam inner core, of three layers, four layers, or 5, 6, 7, 8, 9, 10, 11, 12, 13, 14, 15, 16, 17, 18, 19 or 20 layers.

According to the present invention, the one or more, preferably all, of the present two or more layers are pre-impregnated with a curable resin, preferably an epoxy resin.

Considering the beneficial properties, such as light weight load bearing properties, the present invention relates to, according to another aspect, multi-layered composite structures obtainable with the present methods.

Again, considering the beneficial properties, such as light weight load bearing properties, the present invention relates to, according to yet another aspect, to multi-layered composite structures comprising an inner core of expanded heat-expandable microspheres and optionally a cured resin and an outer surface comprised of at least two or more, preferably, cured layers.

The layers of the present multi-layered composite structures are preferably selected from the group consisting of a carbon fibre layer, an aramid fibre layer and a glass fibre layer and the two or more layers are preferably selected from the group consisting of three layers, four layers, or 5, 6, 7, 8, 9, 10, 11, 12, 13, 14, 15, 16, 17, 18, 19 or 20 layers.

The present multi-layered composite structures are strong and light weight and therefore particularly suitable to be used for a number of applications.

For example, the present multi-layered composite structures can be used in automotive. The multi-layered composite structures are applicable to electric vehicles as well as conventional fossil fuel driven vehicles. By reducing the threshold for implementation of the technology in the automotive industry, overall vehicle weight will be reduced as well as the investment. In passenger transportation, one third of the fuel consumption is determined by vehicle weight. This roughly translates into 0.3-0.5 litres of fuel saved for every 100 kg in weight reduction. On a global scale, the present multi-layered composite structures would be able to drastically reduce fuel consumption.

The present multi-layered composite structures provide a revolutionary approach in vehicle design and composite component design in general. By creating a pressure in the core of the component it is possible to create integrated structures that are not viable with the current status quo in CFRP technology. However, the present multi-layered composite structures are not limited to the automotive industry. There are many industries where the present multi-layered composite structures could beneficial.

In medical industry, prosthetics could become lighter and integrate more functionality. Complex shapes are easily made, making robust custom fit CFRP prosthetics more commercially viable. In robotics, large drones could become more cost effective, whilst keeping weight down. This could push the development of drones for transportation of goods. In industrial automation, the speed of industrial robots is limited by the mass of its components. Industrial robots could become much more agile and speed up production. For electric bicycles, by creating light weight e-bike structures, the size of battery packs can be reduced.

Accordingly, the present invention also relates to the use of the present multi-layered composite structures as a structural load bearing components in medical equipment, prosthetics, sports hardware, industrial robots, construction, vehicles, boats, cars, motors, or bicycles and to the use of the present multi-layered composite structures as a carbon fibre reinforced plastic.

The invention claimed is:

1. A method for producing a multi-layered composite structure, the method comprises the steps of:
   a) providing a sealable or closable mould for said multi-layered composite structure, the mould being the negative or reverse image of said multi-layered composite structure;
   b) layering said mould with two or more layers resulting in a total thickness of 2 cm to 10 cm and forming the outer surface of said multi-layered composite comprising a top layer in contact with a second layer, wherein said two or more layers define a volume of said mould, wherein said two or more layers are selected from the group consisting of carbon fibre layer, aramid fibre layer and glass fibre layer;
   c) filling said volume of said layered mould defined by said two or more layers with a mixture comprising non-expanded heat-expandable microspheres such that the mixture contacts the top layer on all sides, and closing said mould; wherein top portion of said closed mould having two or more layers under said mould surface, and the mixture comprising the non-expanded heat expandable microspheres is in contact with the inverted top layer of the two or more layers;
   d) subjecting said closed mould to an inner temperature of 80° C. to 140° C. during 2 minutes to 230 minutes thereby providing a relative pressure in said closed mould of 0.1 bar to 20 bar through expansion of said heat-expandable microspheres thereby forming a multi-layered composite structure in said mould with a foam enforced inner core and a multi-layered outer surface; and
   e) separating the multi-layered composite structure from said mould.

2. The method according to claim 1, wherein said mixture comprising non-expanded heat-expandable microspheres further comprises a curable resin.

3. The method according to claim 1, wherein said mixture comprising non-expanded heat-expandable microspheres further comprises strength enforcing fibres.

4. The method according to claim 1, wherein said mould is provided with a heat generating layer on the inner-surface thereof.

5. The method according to claim 1, wherein said mould is provided with a temperature sensor capable of measuring the temperature inside said mould.

6. The method according to claim 1, wherein said mould is comprised of an epoxy based material.

7. The method according to claim 1, wherein said two or more layers comprise at least one carbon fibre layer or at least one glass fibre layer.

8. The method according to claim 1, wherein the two or more layers are selected from the group consisting of 3 layers, 4 layers, 5 layers, 6 layers, 7 layers, 8 layers, 9 layers, 10 layers, 11 layers, 12 layers, 13 layers, 14 layers, 15 layers, 16 layers, 17 layers, 18 layers, 19, layers and 20 layers.

9. The method according to claim 1, wherein one or more of said two or more layers are pre-impregnated with a curable resin.

10. The method of claim 2, wherein the curable resin is an epoxy resin.

11. The method of claim 3, wherein the strength enforcing fibers comprise carbon nanotubes and/or carbon fibre.

12. The method of claim 6, wherein the epoxy based material is an epoxy based foam material.

13. The method of claim 9, wherein the curable resin is an epoxy resin.

14. The method according to claim 9, wherein all of said two or more layers are pre-impregnated with a curable resin.

15. The method according to claim 1, wherein said multi-layered composite further comprises a third layer in contact with the second layer.

* * * * *